May 20, 1930.   J. R. HAMILTON   1,759,158
DRY PIPE SPRINKLER MECHANISM
Filed May 26, 1925   2 Sheets-Sheet 1

INVENTOR:
John R. Hamilton
By Attorneys,
Fraser, Myers & Manley

May 20, 1930.  J. R. HAMILTON  1,759,158
DRY PIPE SPRINKLER MECHANISM
Filed May 26, 1925  2 Sheets-Sheet 2
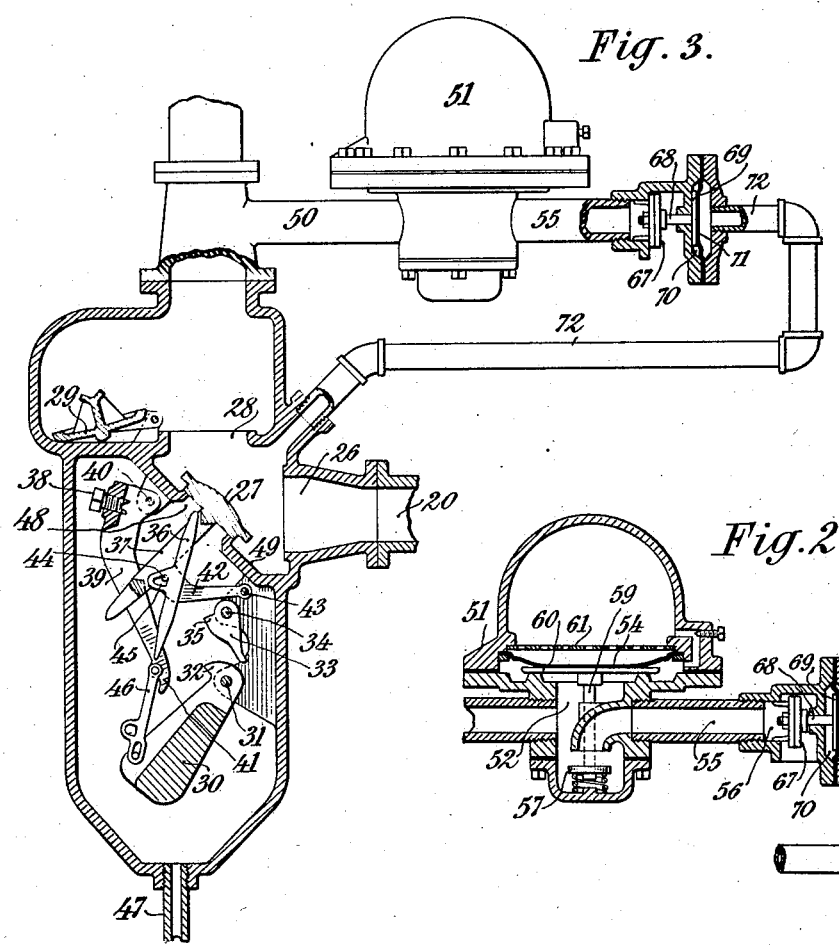
INVENTOR:
John R. Hamilton,
By Attorneys,
Fraser, Myers & Manley.

Patented May 20, 1930

1,759,158

UNITED STATES PATENT OFFICE

JOHN R. HAMILTON, OF YONKERS, NEW YORK, ASSIGNOR TO OHIO AUTOMATIC SPRINKLER COMPANY, OF YOUNGSTOWN, OHIO, A CORPORATION OF OHIO

DRY-PIPE SPRINKLER MECHANISM

Application filed May 26, 1925. Serial No. 32,956.

This invention relates to improvements in fire-extinguishing apparatus, and is particularly adapted for use as a part of a dry pipe sprinkler system.

Although differing as to specific features, the dry pipe sprinkler systems known in the art have certain points in common. Such a system comprises in general a main liquid supply pipe, a distributing pipe usually designated the "dry pipe", and an intermediate chamber. Valved ports connect the intermediate chamber with the supply pipe and with the dry pipe, and the valve mechanism closing these ports is so connected or related that the opening of the valve between the supply pipe and the intermediate chamber is controlled by and dependent upon the opening of the valve between the intermediate chamber and the dry pipe.

The dry pipe is normally maintained under relatively high fluid pressure which opposes the opening of the valve between the dry pipe and the intermediate chamber. The intermediate chamber is usually maintained at atmospheric pressure and is provided with a drip pipe to take care of leakage. On the opening of a sprinkler head connected with the distributing pipe, the pressure in the dry pipe falls, thereby permitting the dry pipe valve to open, which, in turn, permits the liquid supply pipe to open and admit the liquid to the piping of the system.

Devices have heretofore been devised and applied to such systems which, upon the opening of a sprinkler head, effect a relatively rapid venting of the dry pipe, thereby expediting the opening of the valves which control the admission of liquid to the system. Such devices have usually been designed for application to a system of some particular type in which the outlet forming the vent for the dry pipe may be led to the intermediate chamber or to some other appropriate part of the system, whereby the discharge of liquid after the opening of the valves will be prevented.

It is an object of the present invention to provide a dry pipe venting or exhauster device having a normally unrestricted outlet, with improved means automatically adapted to close the vent outlet immediately after the opening of the dry pipe valve, whereby any flow of liquid through the vent outlet will be prevented. This novel vent closing means associated with a dry pipe exhauster or other suitable dry pipe venting device adapts such device for application to the various dry pipe systems now in general use irrespective of their specific features of construction and operation.

In the drawings illustrating the preferred form of the invention,

Fig. 2 is a view, partly in section, of the exhauster and exhauster adapter, the parts being indicated in the positions to which they are moved upon the opening of a sprinkler head.

Fig. 3 is a view, partly in section, of the intermediate chamber, exhauster and exhauster adapter, the valves controlling the ports to the intermediate chamber and valve of the exhauster adapter being indicated in the positions to which they are moved as a result of the venting of the dry pipe.

Figure 1:
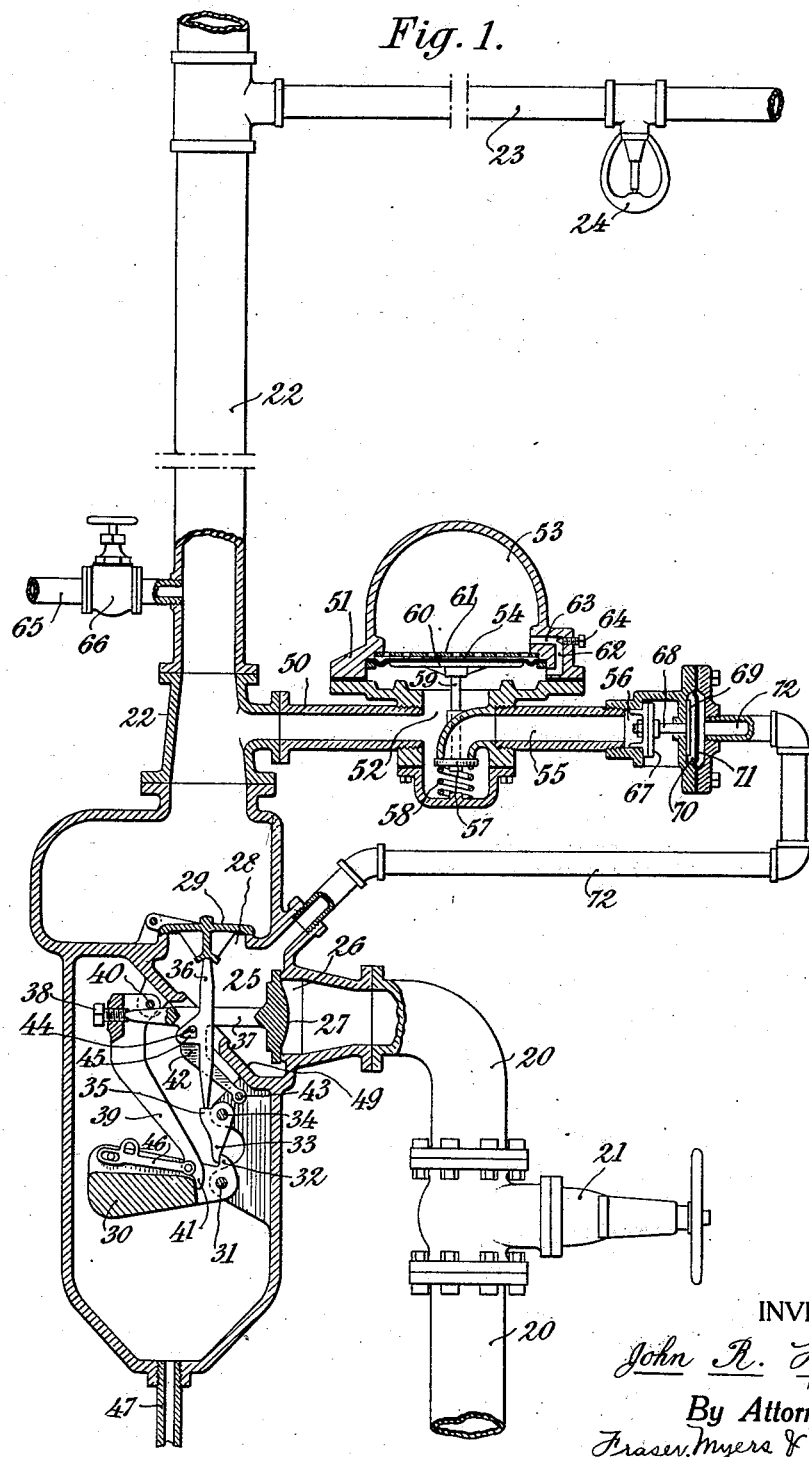
Figure 1 is a view, partly in section, of the main supply pipe, dry pipe, intermediate chamber, dry pipe exhauster, and exhauster adapter embodying the invention herein described and claimed, said parts being indicated in their normal positions.

Referring first to Fig. 1, the reference character 20 designates a liquid supply main provided with a valve 21 controlling the admission of liquid to a sprinkler system including a main distributing pipe 22, hereinafter referred to as the dry pipe, and a number of branch distributing pipes and sprinkler heads herein conventionally represented by the pipe 23 and sprinkler head 24.

The liquid supply pipe 20 and dry pipe 22 are separated by an intermediate chamber 25 having a port 26 closed by a valve 27 normally preventing the admission of liquid from the supply pipe to the intermediate chamber. The intermediate chamber is also provided with a port 28 normally closed by a valve 29 and held in its closed position by air or fluid confined under relatively high pressure in the dry pipe.

The opening of the valve 27 may be controlled by the opening of the valve 29, when the dry pipe is vented, in any appropriate manner. For purposes of illustration there is disclosed herein a gravity-operated controlling mechanism comprising a weight 30 fulcrumed at 31 and having a finger 32 engaging the long arm 33 of a lever fulcrumed at 34 and having its short arm 35 in abutting relation with one end of a strut 36, the other end of which is held in contact with the under side of the valve 29. The valve 27 is provided with a strut 37 having its end held in contact with a set screw 38 threaded in a lever 39 fulcrumed at 40 and having a trigger 41 held in engagement with a retaining surface on the weight 30.

The valve 27 and the strut 37 are provided with a supporting arm 42 fulcrumed at 43. A pin 44 on the arm 42 and a slotted portion 45 of the strut 36 provide a loose connection preventing the complete separation of the strut from other parts of the mechanism during the opening of the valves. A link 46 also provides a loose connection between the lever 39 and the weight 30, thereby preventing undue movement of said parts during the operation of the valves. The relative proportions of the parts are such that, so long as the fluid pressure acting upon the upper surface of the valve 29 is sufficient to sustain the weight 30 in its horizontal position through the intermediary of the strut 36 and lever 33—35, any desired pressure may be maintained in the supply pipe 20 without danger of unseating the valve 27, the tightness of which against its seat may be controlled by the set screw 38.

In order to drain away any leakage about the valve 27 when the parts of the mechanism are in their normal position, the intermediate chamber may be provided with a drip connection 47 preferably open to atmospheric pressure.

On the opening of one of the sprinkler heads 24, the pressure of the fluid in the dry pipe gradually falls until the reactionary force against the upper surface of the valve 29 is no longer sufficient to sustain the weight 30 in its horizontal position. This weight, therefore, swings to the position indicated in Fig. 3, thereby tending to unseat the valve 29 through the intermediary connecting mechanism and at the same time releasing the trigger 41 whereby the lever 39 is permitted to swing about its fulcrum and free the end of the strut 37, after which the valve 27 may be moved by the liquid pressure in the supply pipe to the position indicated in Fig. 3 against a seat surrounding a port 48 in a partition 49 dividing the intermediate chamber into two portions. This shifting of the valve 27 from the port 26 to the port 48 provides a direct passage for liquid from the supply pipe through the upper part of the intermediate chamber to the dry pipe and at the same time prevents escape of the liquid from the lower part of the intermediate chamber through the drip connection 47.

In view of the relatively small area of the outlet afforded by the opening of a sprinkler head, the escape of air sufficient to reduce the pressure in the dry pipe to the extent necessary to effect an operation of the valve mechanism takes an appreciable length of time which is detrimental to the most satisfactory results. In order to expedite the operation of the mechanism, dry pipe systems of the above-described character have been provided with auxiliary venting devices sometimes designated "exhausters". A venting device which has been found satisfactory for such purpose comprises a conduit connected with the dry pipe, normally closed by a valve which is under the control of a fluid pressure motor. Such motor comprises generally a chamber in direct communication with the dry pipe, a second chamber, a working element between said chambers, and a by-pass connecting said chambers and adapted to maintain a substantial equality of pressure in said chambers during relatively slow changes of pressure of the fluid in the dry pipe due to unintentional leakage, changes of temperature, etc. One satisfactory form of exhauster or venting device disclosed herein for purposes of illustration comprises a conduit 50 (Fig. 1) connected with an exhauster casing 51 enclosing two chambers 52, 53, separated from each other by a diaphragm 54. The chamber 52 is provided with a valved outlet 55 leading to a vent port 56. The outlet 55 is normally closed by a valve 57, held against its seat by a spring 58. A valve stem 59 connects the valve 57 with a face plate 60 normally held in contact with the diaphragm 54, which, in turn, is normally maintained in snug engagement with a perforated backing plate 61 forming one of the walls of the chamber 53. The chambers 52, 53 are connected by a conduit 62, 63, the effective cross-sectional area of which may be varied by a needle valve or other appropriate device 64 whereby the conduit may be throttled down to form a by-pass or equalizing connection of any desired capacity.

Under normal conditions the by-pass 62, 63 will maintain an equality of pressure in the chambers 52, 53, even though relatively slow variations of pressure may take place in the dry pipe due to unintentional leakage or to changes of temperature. If, however, one of the sprinkler heads of the system is opened, the pressure in the dry pipe, conduit 50 and chamber 52 falls at such a rate that the capacity of the by-pass is insufficient to preserve an equality of pressure in the chambers 52, 53. As a result, therefore, of the lowering of the pressure in the chamber 52, the fluid pressure in the chamber 53 forces the diaphragm and the connected valve 57 downwardly, thereby affording a vent from the dry pipe through the conduit 50 to the outlet 55 (as indicated in Fig. 2), as a result of which the pressure in the dry pipe is more rapidly lowered and the opening of the primary or dry pipe valve 29 and admission valve 27 accelerated.

The above-described dry pipe system and venting means are intended to be more or less conventional and have been selected for purposes of illustration. They constitute, of themselves, no part of the present invention. They are representative of various types of mechanism to which the invention hereinafter described is adapted for application. At some point in the dry pipe system suitable means should be provided, as, for example, the pipe 65 controlled by the valve 66, whereby the desired fluid pressure may be established in the dry pipe system. The various drip pipes, vent cocks, handholes, etc., made use of in setting the mechanism and maintaining it in normal operative condition, are not shown.

The dry pipe venting means or exhausters of the prior art are more or less dependent upon the particular system with which they were designed to be used. In some instances the part corresponding to the outlet 55 is intended to be connected with some part of the system to which liquid is admitted, in order to prevent leakage when the vent outlet is open and can only be used in connection with a system adapted to receive such a connection. Moreover, such an outlet may afford a vent of sufficient capacity to accelerate the opening of the dry pipe valve and yet be so restricted as to prevent the escape of air from the dry pipe as rapidly as may be desirable. The exhauster adapter, which comprises the novel feature of the invention herein sought to be protected, will now be described. It comprises fluid pressure controlled means for automatically closing the vent outlet by which the operation of the valve mechanism of a dry pipe sprinkler system is accelerated, the vent outlet being unrestricted in diameter and either open to the atmosphere or closed by means which offers but negligible resistance to the escape of fluid. In general, this novel vent closing means may comprise a valve having a normally dormant fluid pressure controlling motor connected with some part of the system, the pressure of which is increased on the admission of liquid to the dry pipe whereby the motor will be energized and close the vent outlet. The vent outlet is thus rendered independent of other parts of the system, and may be of ample diameter throughout to quickly exhaust the dry pipe.

In the form of the invention herein disclosed for purposes of illustration, the vent port 56, which is not restricted in diameter, is provided with a valve 67 connected by a valve stem 68 with a breastplate 69 housed within a chamber 70 divided into two compartments by a diaphragm 71. The compartment of the chamber opposite that which encloses the breastplate 69 is connected by means of a conduit 72 with the upper compartment of the intermediate chamber 25. Under normal conditions, when the intermediate chamber is opened to atmospheric pressure, the motor formed by the diaphragm 71 and associated parts is dormant and the valve 67, valve stem 68 and breastplate 69 may be freely moved from an open to a closed position, and vice versa. These parts may, therefore, if desired, be moved to the position illustrated in Fig. 1 so as to normally close the vent port and exclude the entrance of dust and dirt. On the opening of a sprinkler head and the consequent operation of the venting means, the fluid which is released through the valve 57 and outlet 55 will immediately move the valve 67 to its open position, thereby causing the breastplate 69 to be thrust into close contact with the diaphragm 71, as indicated in Fig. 2. This free movement of the valve opens the vent port 56 and affords an unrestricted outlet for the fluid of the dry pipe system.

Immediately upon the opening of the dry pipe valve 29 and the consequent opening of the admission valve 27, the flow of liquid from the supply pipe 20 into other parts of the system rapidly builds up the pressure, whereby the fluid trapped in the conduit 72 is forced into the connected compartment against the diaphragm 71 and causes the valve 67 to be moved forcibly against its seat, thereby closing the vent port and preventing the escape of liquid, as clearly indicated in Fig. 3 of the drawing.

In the form of the invention herein relied upon for purposes of illustration the intermediate chamber 25 has been selected as an appropriate part of the system with which to connect the energizing conduit 72 of the adapter motor. It will be apparent, however, that the conditions essential to proper operation of the motor are merely that the diaphragm shall be maintained in a position clear of the valve 67 prior to the opening of the dry pipe valve and admission valve and that the motor shall be energized from some part of the system the pressure of which is sufficiently increased upon the opening of said valves to cause the diaphragm to forcibly close the valve 67 and prevent leakage.

It will be apparent that the present invention, which makes it unnecessary to lead the outlet from the dry pipe venting means or exhauster to any particular part of the system, adapts the exhauster for application to dry pipe systems varying widely as to their specific features of construction and operation, thereby materially increasing the field of usefulness of the exhauster in combination with which the adapter is used. It also makes it possible to provide such system with an automatically controlled vent which may be of ample capacity to satisfactorily vent the dry pipe and yet be closed in time to prevent the escape of liquid.

The invention is not intended to be limited to the particular forms which have been selected for purposes of illustration but may be varied or modified in accordance with the scope of the appended claims.

What is claimed is:

1. Venting means for a dry pipe sprinkler system comprising an open-ended conduit connected with the part of the system to be vented, said conduit being of sufficient diameter throughout to afford a free and copious vent, a normally effective closure intermediate the ends of the conduit, self-restoring means controlled by a sudden diminution of fluid pressure in the part of the system to be vented for effecting an opening of said closure, and an externally-disposed normally ineffective means for closing the open end of said conduit, said closing means comprising a normally dormant fluid pressure motor and means operated thereby when energized to render the closing means effective.

2. Venting means for a dry pipe sprinkler system comprising an open-ended conduit connected with the part of the system to be vented, said conduit being of sufficient diameter throughout to afford a free and copious vent, a normally effective closing means for said conduit, and a normally ineffective closing means therefor, said normally effective closing means being located between said normally ineffective closing means and the part of the system to be vented and having a directly-connected, self-restoring, operating motor comprising a fluid pressure chamber in direct communication with said conduit, a second fluid pressure chamber, and a movable working element separating said chambers, said chambers being connected by a restricted by-pass capable of slowly transmitting fluid from one of said chambers to the other, and said normally ineffective closing means comprising an externally-disposed fluid pressure motor and means controlled thereby when energized to close the vent afforded by said conduit.

3. A dry pipe sprinkler system comprising a container subjected to fluid pressure, an open-ended vent connected therewith having a normally effective intermediate closure, and a closing device for the port in the open end of said vent consisting of a valve which is normally free to be moved from its port-closing position to its port-opening position, and vice versa, whereby it may be placed and left in its port-closing position without offering any material obstruction to movement to its port-opening position to permit the escape of fluid from said port, when the closure in the vent is opened, and a fluid pressure motor normally having an unobstructive relationship with respect to the movements of said valve but capable, when energized, of forcibly moving said valve to its port-closing position if previously removed therefrom, and of forcibly maintaining it in such port-closing position.

In witness whereof, I have hereunto signed my name.

JOHN R. HAMILTON.